United States Patent
Chang et al.

(10) Patent No.: US 10,073,570 B2
(45) Date of Patent: *Sep. 11, 2018

(54) MUTUAL CAPACITANCE TOUCH SENSING DEVICE AND METHOD FOR INSPECTING SAME

(71) Applicant: eGalax_eMPIA Technology Inc., Taipei (TW)

(72) Inventors: Chin-Fu Chang, Taipei (TW); Shang-Tai Yeh, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 654 days.

This patent is subject to a terminal disclaimer.

(21) Appl. No.: 14/581,016

(22) Filed: Dec. 23, 2014

(65) Prior Publication Data

US 2015/0185276 A1  Jul. 2, 2015

(30) Foreign Application Priority Data

Dec. 27, 2013 (TW) .............................. 102148787 A

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 8,519,722 B1* | 8/2013 | Prendergast | G06F 3/0418 324/658 |
| 9,367,172 B2* | 6/2016 | Chang | G06F 3/0418 |
| 9,600,128 B2* | 3/2017 | Chang | G06F 3/044 |
| 9,606,685 B2* | 3/2017 | Chang | G06F 3/0416 |
| 2006/0279551 A1* | 12/2006 | Lii | G06F 3/044 345/173 |
| 2008/0158167 A1* | 7/2008 | Hotelling | G06F 3/0416 345/173 |
| 2010/0156795 A1* | 6/2010 | Kim | G06F 3/044 345/168 |
| 2011/0063993 A1* | 3/2011 | Wilson | G06F 3/044 370/254 |

(Continued)

*Primary Examiner* — J. H. Hur
(74) *Attorney, Agent, or Firm* — Muncy, Geissler, Olds & Lowe, P.C.

(57) ABSTRACT

A mutual capacitance touch sensing device inspection method is performed by: measuring the capacitive coupling amounts of all the crossover points between driving lines and sensing lines of the touch sensing panel, and then integrating the measured capacitive coupling amounts and the respective crossover point coordinate data into respective 2-D sensing information for creating local 2-D sensing information by integrating each predetermined number of adjacent crossover points and the respective capacitive coupling amounts so that the processor can get respective flatness indexes and integrate the flatness indexes and the respective coordinate data of the local 2-D sensing information into a flatness index information for determine the touch sensing panel to be a qualified, defective-acceptable or defective product.

11 Claims, 9 Drawing Sheets

(56) References Cited

U.S. PATENT DOCUMENTS

| | | | |
|---|---|---|---|
| 2012/0081332 A1* | 4/2012 | Atsuta | G06F 3/044 345/174 |
| 2012/0212240 A1* | 8/2012 | Young | G01R 27/2605 324/679 |
| 2012/0249442 A1* | 10/2012 | Chang | G06F 3/0416 345/173 |
| 2012/0313888 A1* | 12/2012 | Lee | G06F 3/044 345/174 |
| 2013/0063370 A1* | 3/2013 | Lee | G06F 3/044 345/173 |
| 2013/0093500 A1* | 4/2013 | Bruwer | H03K 17/955 327/517 |
| 2013/0106774 A1* | 5/2013 | Radivojevic | G06F 3/044 345/174 |
| 2014/0049494 A1* | 2/2014 | Niu | G06F 3/0488 345/173 |
| 2014/0267139 A1* | 9/2014 | Slaby | G06F 3/044 345/174 |
| 2015/0002441 A1* | 1/2015 | Brunet | G06F 3/044 345/174 |

* cited by examiner

MUTUAL CAPACITANCE TOUCH SENSING DEVICE AND METHOD FOR INSPECTING SAME

This application claims the priority benefit of Taiwan patent application number 102148787, filed on Dec. 27, 2013.

BACKGROUND OF THE INVENTION

1. Field of the Invention

The present invention relates to touch sensing technology and more particularly, to a mutual capacitance touch sensing device and method for inspecting same that uses a flatness index information to inspect each touch sensing panel to be a qualified, defective-acceptable or defective product.

2. Description of the Related Art

In order to comply with human intuition, touch sensing devices are widely used in modern electronic products, enabling the user to control electronic products conveniently by means of a touch of a finger or stylus.

A touch sensing device generally includes a touch sensing panel having arranged therein a plurality of driving lines and sensing lines to form a plurality of crossover points for sensing. During the use of a touch sensing device, the driving lines are respectively capacitively coupled to the respective sensing lines, causing generation of a measurable capacitive coupling amount at each crossover point. The value of the capacitive coupling generated at each crossover point can be directly or indirectly obtained by measuring a specific physical quantity on the respective crossover point, such as the capacitance value, current value, voltage value or amount of electrical charge. Thus, when an external object (finger or stylus) touches the touch sensing panel, the value of the capacitive coupling generated at the corresponding crossover point is relatively changed. The touch control status can thus be known by measuring the variation of the value of the capacitive coupling.

Because the driving lines and sensing lines of a touch sensing panel are fine lines, the size and arrangement of the driving lines and the sensing lines must be precisely controlled during the fabrication of the touch sensing panel. Minor gluing defect or lamination defect of the driving lines and the sensing lines can lead to a defective touch sensing panel. If a defective touch sensing panel is not inspected and found during the manufacturing process, it will be continuously processed through a series of follow-up processing procedures, such as packing, delivery, and etc., resulting in unnecessary waste.

Thus, how to inspect touch sensing panels so as to discover any defective touch sensing panels at an early stage and to prevent the problem of unnecessary waste due to continuously processing a defective touch sensing panel through a series of follow-up processing procedures is an important subject to study in touchscreen technology.

SUMMARY OF THE INVENTION

The present invention has been accomplished under the circumstances in view. It is therefore the main object of the present invention to provide a mutual capacitance touch sensing device and method for inspecting same, which uses a flatness index information to inspect each touch sensing panel to be a qualified, defective-acceptable or defective product, eliminating the problem of unnecessary waste due to continuously processing a defective touch sensing panel through a series of follow-up processing procedures, such as packing, delivery, and etc.

To achieve this and other objects of the present invention, a mutual capacitance touch sensing device inspection method of the present invention is adapted for inspecting the quality of a touch sensing panel of a mutual capacitance touch sensing device by measuring the capacitive coupling amount of each of all the crossover points between the respective driving lines and the respective sensing lines of the touch sensing panel, and then integrating the measured capacitive coupling amounts at all the crossover points and the respective coordinate data of the all crossover points into respective 2-dimensional sensing information, and then enabling a processor of the mutual capacitance touch sensing device to create local 2-dimensional sensing information by integrating each predetermined number of adjacent crossover points of all the crossover points and their respective capacitive coupling amounts, and then enabling the processor to compute all the created local 2-dimensional sensing information so as to get respective flatness indexes, and then enabling the processor to integrate the respective flatness indexes and the respective coordinate data of the local 2-dimensional sensing information into a flatness index information, and then enabling the processor to compare each flatness index of the flatness index information with a predetermined flatness index negative reference value, a predetermined flatness index positive reference value, a predetermined lower limit value and a predetermined upper limit value so as to determine the touch sensing panel to be a qualified (up-to-grade) product, a defective-acceptable product or a defective product.

To achieve this and other objects of the present invention, a mutual capacitance touch sensing device of the invention includes a touch sensing panel comprising a plurality of driving lines extending along a first axis and a plurality of sensing lines extending along a second axis and crossed over the driving lines to form a plurality of crossover points, a driving and sensing circuit electrically connected with the driving lines and the sensing line and adapted for measuring the capacitive coupling amount of each of all the crossover points and then integrating the measured capacitive coupling amounts of all the crossover points and the respective coordinate data of the crossover points into respective 2-dimensional sensing information, a processor electrically connected with the driving and sensing circuit for computing the 2-dimensional sensing information to get a flatness index information and then using the flatness index information to determine the touch sensing panel to be a qualified product or a defective product, and a memory electrically connected to the processor and adapted for storing the flatness indexes.

Further, the processor can store all the flatness indexes of the flatness index information in the memory, or simply store the defective-acceptable flatness indexes in the memory. When using the mutual capacitance touch sensing device, the processor reads in the storage flatness indexes or defective-acceptable flatness indexes from the memory, and uses them as of zero value to constitute the flatness index information for touch sensing application. Simply storing the defective-acceptable flatness indexes in the memory greatly reduces memory space occupation while effectively assisting the touch sensing application. Thus, the invention enhances the applicability of the mutual capacitance touch sensing device and attracts people to but the product.

DETAILED DESCRIPTION OF THE PREFERRED EMBODIMENT

Figure 1:
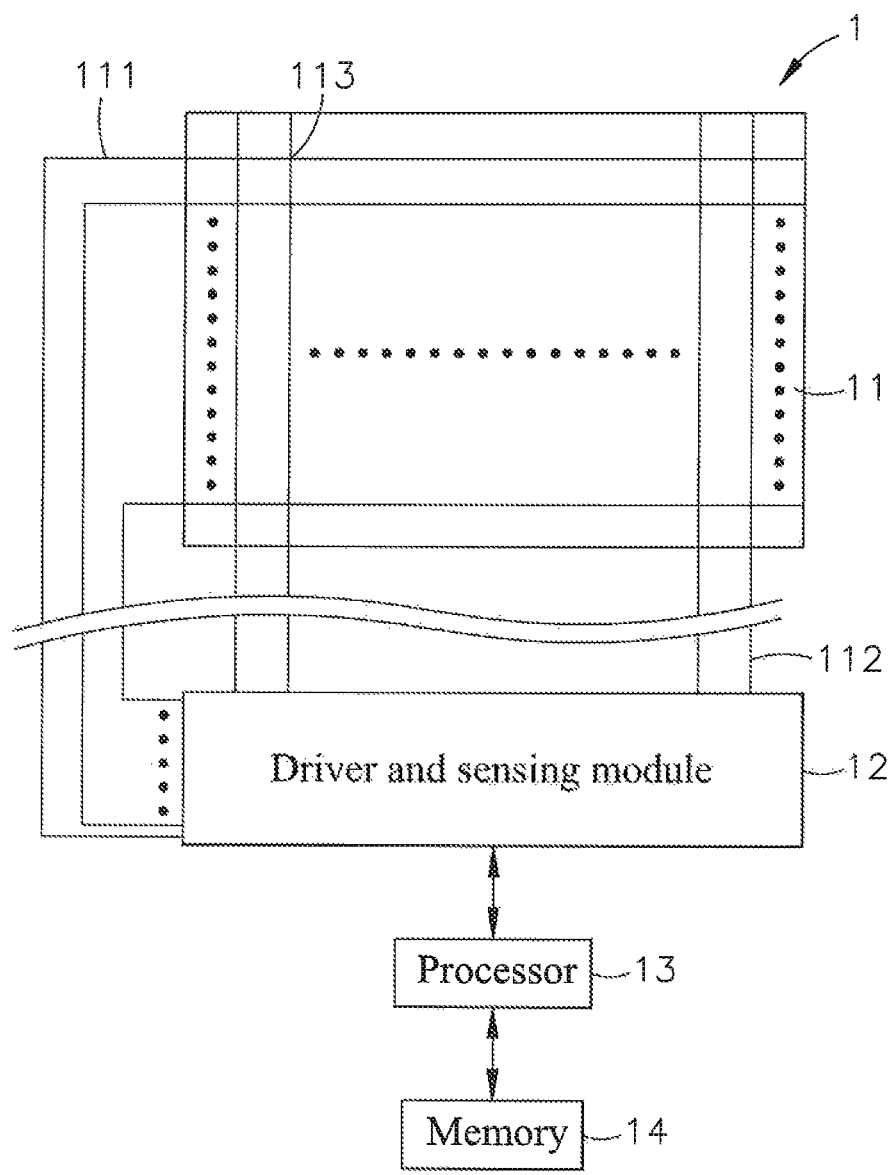
FIG. 1 is a schematic circuit block diagram of a mutual capacitance touch sensing device in accordance with the present invention.

Referring to FIG. 1, a mutual capacitance touch sensing device 1 in accordance with the present invention is shown. The mutual capacitance touch sensing device 1 includes a touch sensing panel 11 having arranged therein a plurality of driving lines 111 extending along a first axis in a parallel manner and a plurality of sensing lines 112 extending along a second axis in a parallel manner and crossed over the driving lines 111 in an orthogonal crossover configuration (or non-orthogonal crossover configuration) to form a plurality of crossover points 113, a driving and sensing circuit 12 electrically connected with the driving lines 111 and the sensing lines 112, a processor 13 electrically connected with the driving and sensing circuit 12, and a memory 14 electrically connected to the processor 13.

The touch sensing panel 11 of the mutual capacitance touch sensing device 1 can be composed of one or multiple sensing layers. If the touch sensing panel 11 is of a single layer design, the driving lines 111 and the sensing lines 112 are arranged in the same sensing layer. If the touch sensing panel 11 is of a multi-layer design, the driving lines 111 and the sensing lines 112 are arranged in different sensing layers.

The driving and sensing circuit 12 of the mutual capacitance touch sensing device 1 can be a combination circuit consisting of a driver chip and a sensor chip where the driver chip is electrically coupled with the driving lines 111; the sensor chip is electrically coupled with the sensing lines 112. Alternatively, the driving and sensing circuit 12 can be a monolithic integrated circuit having a driving circuit and a sensing circuit integrated therein.

Figure 2:
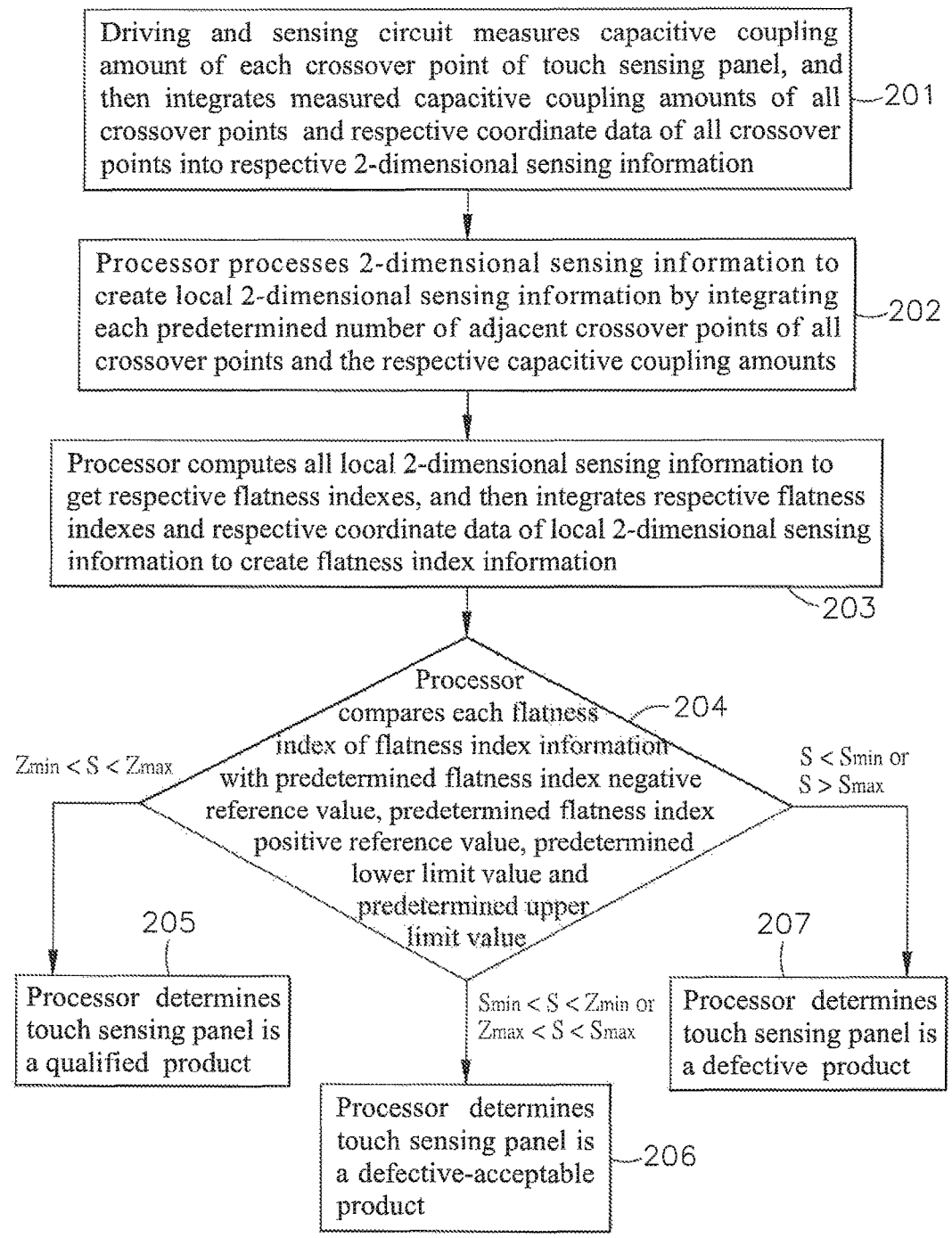
FIG. 2 is a flow chart of a mutual capacitance touch sensing device inspection method in accordance with the present invention.

Referring to FIG. 2, a mutual capacitance touch sensing device inspection method for inspecting the quality of a mutual capacitance touch sensing device in accordance with the present invention includes the following steps:

(201) The driving and sensing circuit 12 measures the capacitive coupling amount C of each of all the crossover points 113 of the touch sensing panel 11, and then integrates the measured capacitive coupling amount C of each of all the crossover points 113 and the respective coordinate data of the all crossover points 113 into respective 2-dimensional sensing information $C_a$.

(202) The processor 13 processes the 2-dimensional sensing information $C_a$ to create local 2-dimensional sensing information $C_p$ by integrating each predetermined number of adjacent crossover points 113 of all the crossover points 113 and their respective capacitive coupling amounts C.

(203) The processor 13 computes all the created local 2-dimensional sensing information $C_p$ to get respective flatness indexes S, and then integrates the respective flatness indexes S and the respective coordinate data of the local 2-dimensional sensing information $C_p$ to create a flatness index information $S_a$.

(204) The processor 13 compares each flatness index S of the flatness index information $S_a$ with a predetermined flatness index negative reference value $Z_{min}$, a predetermined flatness index positive reference value $Z_{max}$, a predetermined lower limit value $S_{min}$ and a predetermined upper limit value $S_{max}$; and then proceeds to step (205) if each flatness index S is in the range between the predetermined flatness index negative reference value $Z_{min}$ and the predetermined flatness index positive reference value $Z_{max}$ ($Z_{min}<S<Z_{max}$), or step (206) if each flatness index S is in the range between the predetermined lower limit value $S_{min}$ and the predetermined flatness index negative reference value $Z_{min}$ ($S_{min}<S<Z_{min}$) or in the range between the predetermined flatness index positive reference value $Z_{max}$ and the predetermined upper limit value $S_{max}$ ($Z_{max}<S<S_{max}$), or step (207) if any one of the flatness indexes S is smaller than the predetermined lower limit value $S_{min}$ ($S<S_{min}$) or greater than the predetermined upper limit value $S_{max}$ ($S>S_{max}$).

(205) The processor 13 determines that the touch sensing panel 11 is a qualified (up-to-grade) product.

(206) The processor 13 determines that the defective of the product is within the acceptable range and the touch sensing panel 11 is a defective-acceptable product.

(207) The processor 13 determines that the touch sensing panel 11 is a defective product.

In the aforesaid steps when the touch sensing panel 11 starts mutual-capacitive detection, the driving and sensing circuit 12 provides a driving signal to every driving line 111 of the touch sensing panel 11. At this time, each driving line 111 is capacitively coupled with the respective sensing line 112 to generate a respective capacitive coupling amount C at the associating crossover points 113 of the touch sensing panel 11. The driving and sensing circuit 12 can directly or indirectly get the capacitive coupling amount C at each crossover point 113 by measuring the physical quantity of the capacitance value, current value, voltage value or electrical charge amount at the respective crossover point 113. Thereafter, the driving and sensing circuit 12 integrates the measured capacitive coupling amount C of each of all the crossover points 113 and the coordinate data of each of all the crossover points 113 into respective 2-dimensional sensing information $C_a$. Thereafter, the processor 13 processes the 2-dimensional sensing information $C_a$ to create local 2-dimensional sensing information $C_p$ by integrating each predetermined number of adjacent crossover points 113 of all the crossover points 113 and their respective capacitive coupling amounts C, and then computes all the created local 2-dimensional sensing information $C_p$ to get respective flatness indexes S, and then integrates the respective flatness indexes S and the respective coordinate data of the local 2-dimensional sensing information $C_p$ to create a flatness index information $S_a$, and then uses this flatness index information $S_a$ to judge the touch sensing panel 11 to be a qualified, defective-acceptable or defective product.

Figure 3:
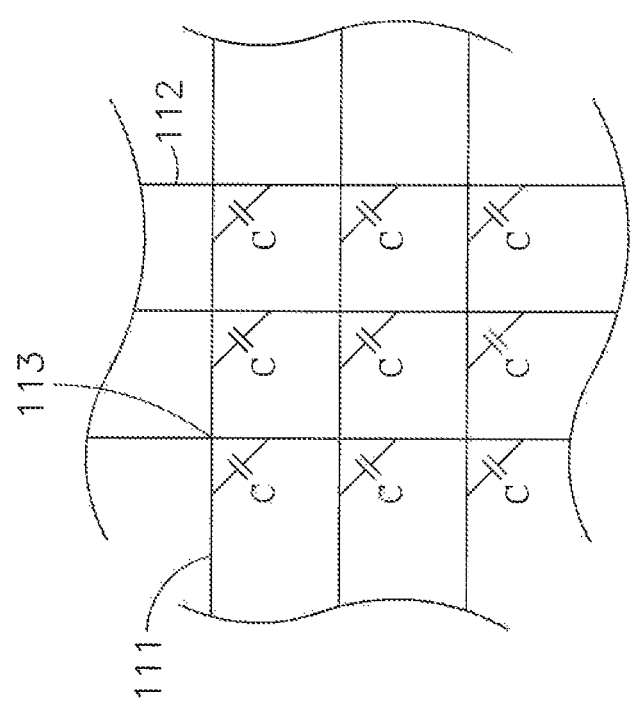
FIG. 3 is a schematic enlarged view of the touch sensing panel of the mutual capacitance touch sensing device in accordance with the present invention.

Referring to FIG. 3, in the creation of the flatness index information $S_a$, each local 2-dimensional sensing information $C_p$ can be obtained by: integrating the coordinate data of the four crossover points 113 between two adjacent driving lines 111 and two respective adjacent sensing lines 112 and the capacitive coupling amounts C of these four crossover points 113, or by: integrating the coordinate data of the six crossover points 113 between three adjacent driving lines 111 and two respective adjacent sensing lines 112 and the capacitive coupling amounts C of these six crossover points 113, i.e., the local 2-dimensional sensing information $C_p$ are created by integrating each predetermined number of crossover points 113 between a predetermined number of adjacent driving lines 111 and respective multiple adjacent sensing lines 112 and the capacitive coupling amounts C of the respective multiple crossover points 113. Thereafter, the processor 13 computes all the created local 2-dimensional sensing information $C_p$ to get respective flatness indexes S, and then integrates the respective flatness indexes S and the respective coordinate data of the local 2-dimensional sensing information $C_p$ to create a flatness index information $S_a$.

Further, the processor 13 computes each local 2-dimensional sensing information $C_p$ to get a respective flatness index S by: subtracting the multiple capacitive coupling amounts at each driving line 111 from one another in the order along the first axis to get respective remainders, and then subtracting the remainders from one another in the order along the second axis. For example, if the local 2-dimensional sensing information $C_p$ is created by integrating four crossover points 113 between two adjacent driving lines 111 and respective two adjacent sensing lines 112 and the capacitive coupling amounts C of these four crossover points 113, at this time, subtract the capacitive coupling amounts C at each of these two driving lines 111 from each other in the order along the first axis, and then subtract the two remainders thus obtained from each other in the order along the second axis. Because the capacitive coupling amounts C at all the crossover points 113 are approximately equal under normal conditions, the flatness index S obtained by subtracting the capacitive coupling amounts C is approximately equal to zero, i.e., the flatness index S will be in the range between the predetermined flatness index negative reference value $Z_{min}$ and the predetermined flatness index positive reference value $Z_{max}$. On the contrary, if the flatness index S is abnormal, it will be lower than the predetermined lower limit value $S_{min}$ or higher than the predetermined upper limit value $S_{max}$. Further, the predetermined lower limit value $S_{min}$ is smaller than the predetermined flatness index negative reference value $Z_{min}$; the predetermined upper limit value $S_{max}$ is larger than the predetermined flatness index positive reference value $Z_{max}$. The predetermined flatness index negative reference value $Z_{min}$, the predetermined flatness index positive reference value $Z_{max}$, the predetermined lower limit value $S_{min}$ and the predetermined upper limit value $S_{max}$ are built in the processor 13 for enabling the processor 13 to compare each flatness index S in the flatness index information $S_a$ with the predetermined flatness index negative reference value $Z_{min}$, the predetermined flatness index positive reference value $Z_{max}$, the predetermined lower limit value $S_{min}$ and the predetermined upper limit value $S_{max}$ for determining whether or not a defective of the touch sensing panel 11 produced by the local 2-dimensional sensing information $C_p$ of any flatness index S is within the acceptable range.

Figure 4:
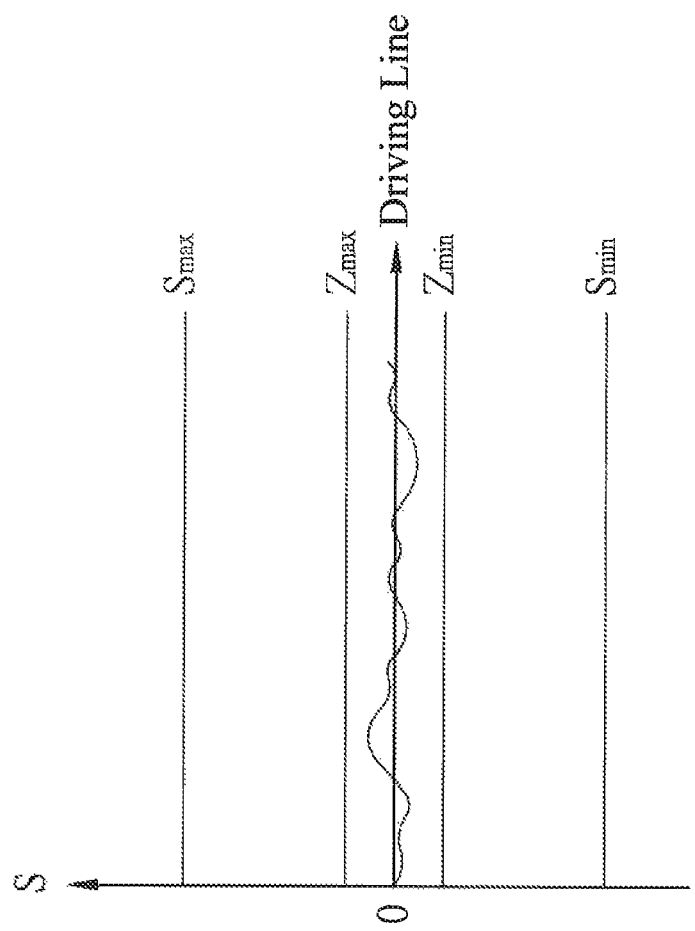
FIG. 4 is a flatness index curve obtained from a qualified (up-to-grade) touch sensing panel in accordance with the present invention.
Figure 5:
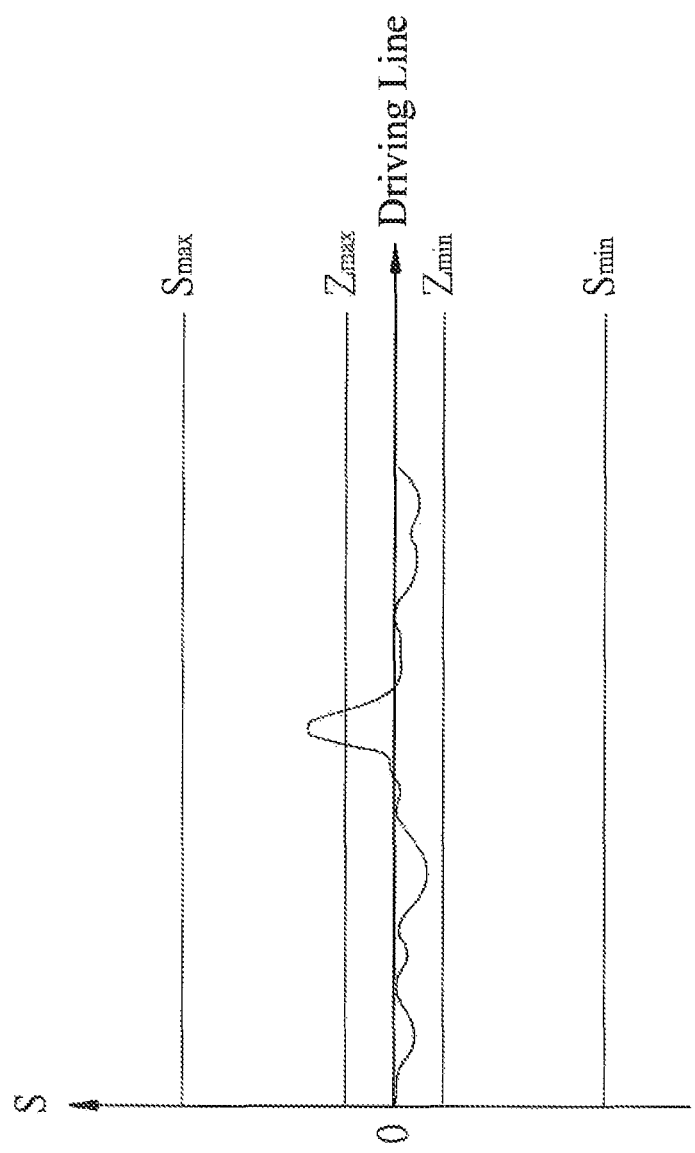
FIG. 5 is a flatness index curve obtained from a defective-acceptable touch sensing panel in accordance with the present invention.
Figure 6:
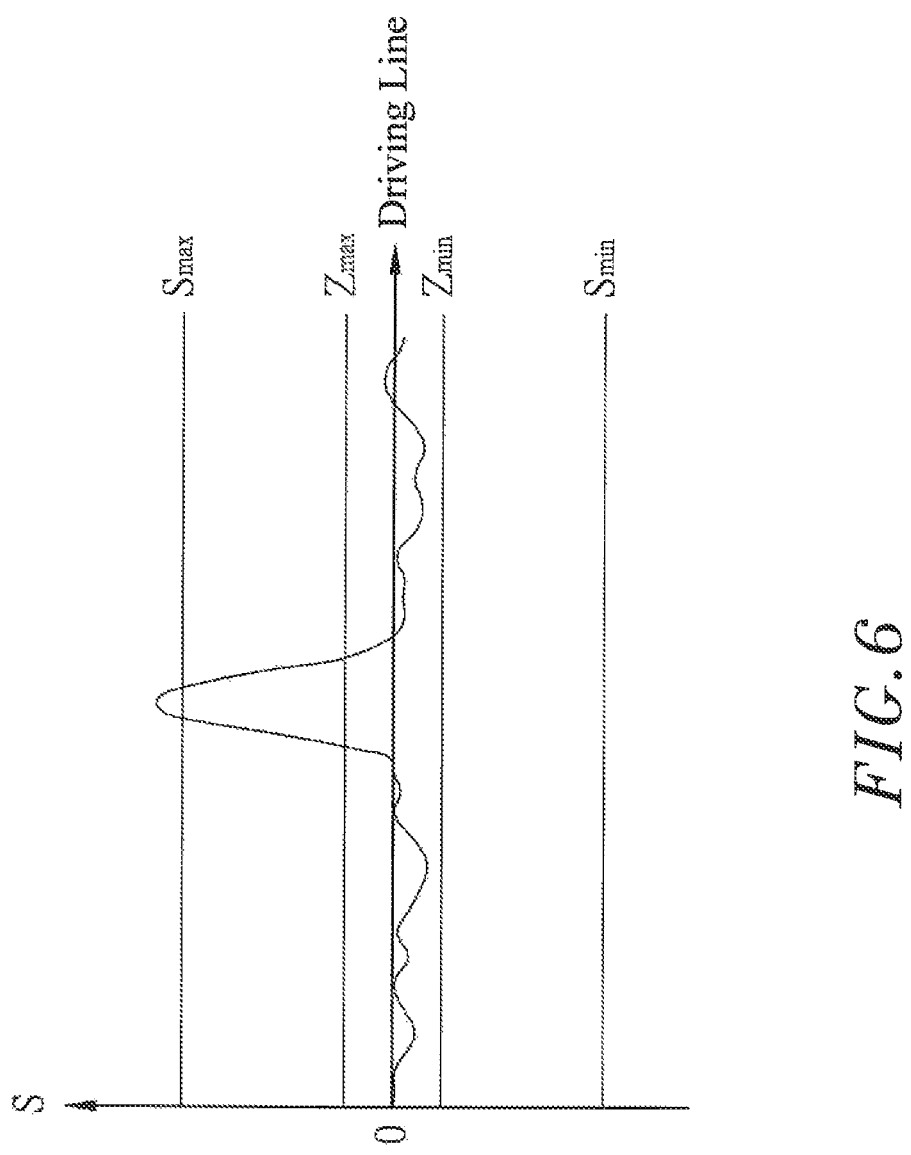
FIG. 6 is a flatness index curve obtained from a defective touch sensing panel in accordance with the present invention.

Referring to FIGS. 4-6, flatness index curves respectively obtained from a qualified (up-to-grade) touch sensing panel, a defective-acceptable touch sensing panel and a defective touch sensing panel in accordance with the present invention are shown. In FIGS. 4-6, the horizontal axis indicates the arrangement of all the crossover points 113 on the driving line 111; the vertical axis indicates the flatness indexes S of the respective crossover points 113. When the processor 13 uses the flatness index information $S_a$ to determined the touch sensing panel 11 to be a qualified (up-to-grade), defective-acceptable or defective touch sensing panel, it compares each flatness index S of the flatness index information $S_a$ with the predetermined flatness index negative reference value $Z_{min}$, flatness index positive reference value $Z_{max}$, lower limit value $S_{min}$ and upper limit value $S_{max}$. If every flatness index S is in the range between the predetermined flatness index negative reference value $Z_{min}$ and the predetermined flatness index positive reference value $Z_{max}$ ($Z_{min}<S<Z_{max}$) (see FIG. 4), the processor 13 determines that the touch sensing panel 11 is a qualified (up-to-grade) product. If any one flatness index S is in the range between the predetermined lower limit value $S_{min}$ and the predetermined flatness index negative reference value $Z_{min}$ ($S_{min}<S<Z_{min}$) or in the range between the predetermined flatness index positive reference value $Z_{max}$ and the predetermined upper limit value $S_{max}$ ($Z_{max}<S<S_{max}$) (see FIG. 5), the processor 13 determines that the touch sensing panel 11 is a defective-acceptable product. If any one of the flatness indexes S is smaller than the predetermined lower limit value $S_{min}$ ($S<S_{min}$) or greater than the predetermined upper limit value $S_{max}$ ($S>S_{max}$) (see FIG. 6), the processor 13 determines that the touch sensing panel 11 is a defective product.

The mutual capacitance touch sensing device inspection method of the present invention is adapted for inspecting the quality of a touch sensing panel 11 of a mutual capacitance touch sensing device 1 by: measuring the capacitive coupling amount C of each of all the crossover points 113 between the respective driving lines 111 and the respective sensing lines 112 of the touch sensing panel 11, and then integrating the measured capacitive coupling amounts C of all the crossover points 113 and the respective coordinate data of the all crossover points 113 into respective 2-dimensional sensing information $C_a$, and then enabling the processor 13 to create local 2-dimensional sensing information $C_p$ by integrating each predetermined number of adjacent crossover points 113 of all the crossover points 113 and their respective capacitive coupling amount C, and then enabling the processor 13 to compute all the created local 2-dimensional sensing information $C_p$ so as to get respective flatness indexes S, and then enabling the processor 13 to integrate the respective flatness indexes S and the respective coordinate data of the local 2-dimensional sensing information $C_p$ into a flatness index information $S_a$, and then enabling the processor 13 to compare each flatness index S of the flatness index information $S_a$ with a predetermined flatness index negative reference value $Z_{min}$, a predetermined flatness index positive reference value $Z_{max}$, a predetermined lower limit value $S_{min}$ and a predetermined upper limit value $S_{max}$ so as to determine the touch sensing panel 11 to be a qualified (up-to-grade) product, a defective-acceptable product or a defective product. Thus, any minor gluing defect or lamination defect of the driving lines 222 and sensing lines 112 of the touch sensing panel 11 during its fabrication can be found, eliminating the problem of unnecessary waste due to continuously processing a defective touch sensing panel through a series of follow-up processing procedures, such as packing, delivery, and etc.

In the aforesaid flatness index information $S_a$, if one or multiple flatness indexes S are regarded as acceptable defectives, the flatness indexes S are in the range between the predetermined upper limit value $S_{max}$ and lower limit value $S_{min}$ and greater than the predetermined flatness index positive reference value $Z_{max}$ or smaller than the predetermined flatness index negative reference value $Z_{min}$. At this time, the processor 13 stores all the flatness indexes S of the flatness index information $S_a$ in the memory 14, or simply stores the defective-acceptable flatness indexes S in the memory 14. When using the mutual capacitance touch sensing device 1, the processor 13 reads in the storage flatness indexes S or defective-acceptable flatness indexes S from the memory 14, and uses them as of zero value to constitute the flatness index information $S_a$ for touch sensing application. Simply storing the defective-acceptable flatness indexes S in the memory 14 greatly reduces memory space occupation while effectively assisting the touch sensing application. Thus, the invention enhances the applicability of the mutual capacitance touch sensing device and attracts people to but the product.

Figure 7:
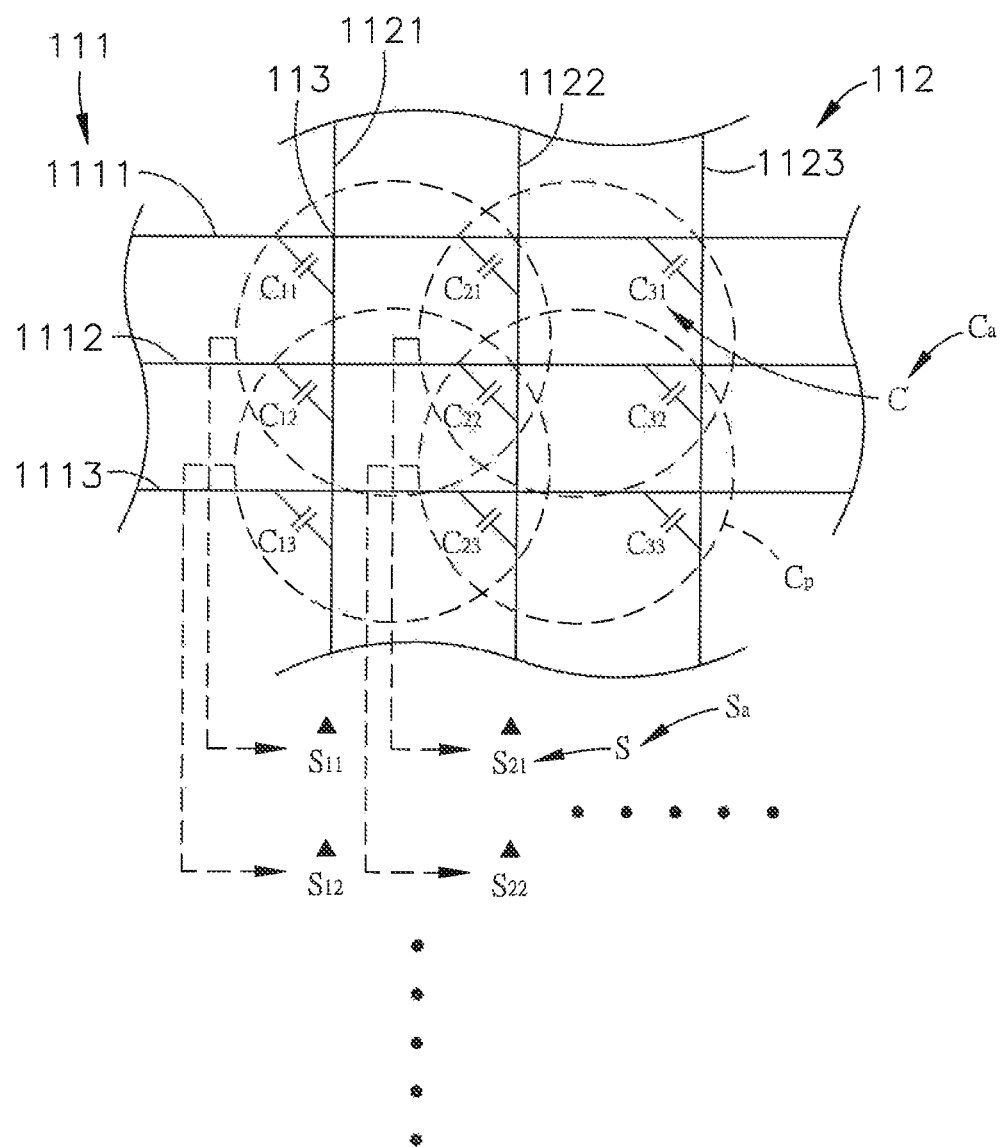
FIG. 7 is a schematic drawing illustrating one example of the creation of the flatness index information in accordance with the present invention.

Referring to FIG. 7, the aforesaid 2-dimensional sensing information $C_a$ contain multiple partially superimposed local 2-dimensional sensing information $C_p$. For example, if one local 2-dimensional sensing information $C_p$ contain four crossover points 113 between two adjacent driving lines 111 and two respective adjacent sensing lines 112 and the respective capacitive coupling amounts C of these four crossover points 113, thus: the coordinate data of the four crossover points 113 between the first and second driving lines 1111 and 1112 and the first and second sensing lines 1121 and 1122 are integrated with the respective capacitive coupling amounts C of these four crossover points 113 into one local 2-dimensional sensing information $C_p$; the coordinate data of the four crossover points 113 between the first and second driving lines 1111 and 1112 and the second and third sensing lines 1122 and 1123 are integrated with the respective capacitive coupling amounts C of these four crossover points 113 into one local 2-dimensional sensing information $C_p$; by the same token, all local 2-dimensional sensing information $C_p$ based on the crossover points 113 between the first and second driving lines 1111 and 1112 and all each two adjacent sensing lines 112 are obtained. In the same manner, the coordinate data of the four crossover points 113 between the second and third driving lines 1112 and 1113 and the first and second sensing lines 1121 and 1122 are integrated with the respective capacitive coupling amounts C of these four crossover points 113 into one local 2-dimensional sensing information $C_p$; the coordinate data of the four crossover points 113 between the second and third driving lines 1112 and 1113 and the second and third sensing lines 1122 and 1123 are integrated with the respective capacitive coupling amounts C of these four crossover points 113 into one local 2-dimensional sensing information $C_p$; by the same token, all local 2-dimensional sensing information $C_p$ based on the crossover points 113 between the second and third driving lines 1112 and 1113 and all each two adjacent sensing lines 112 are obtained.

Figure 8:
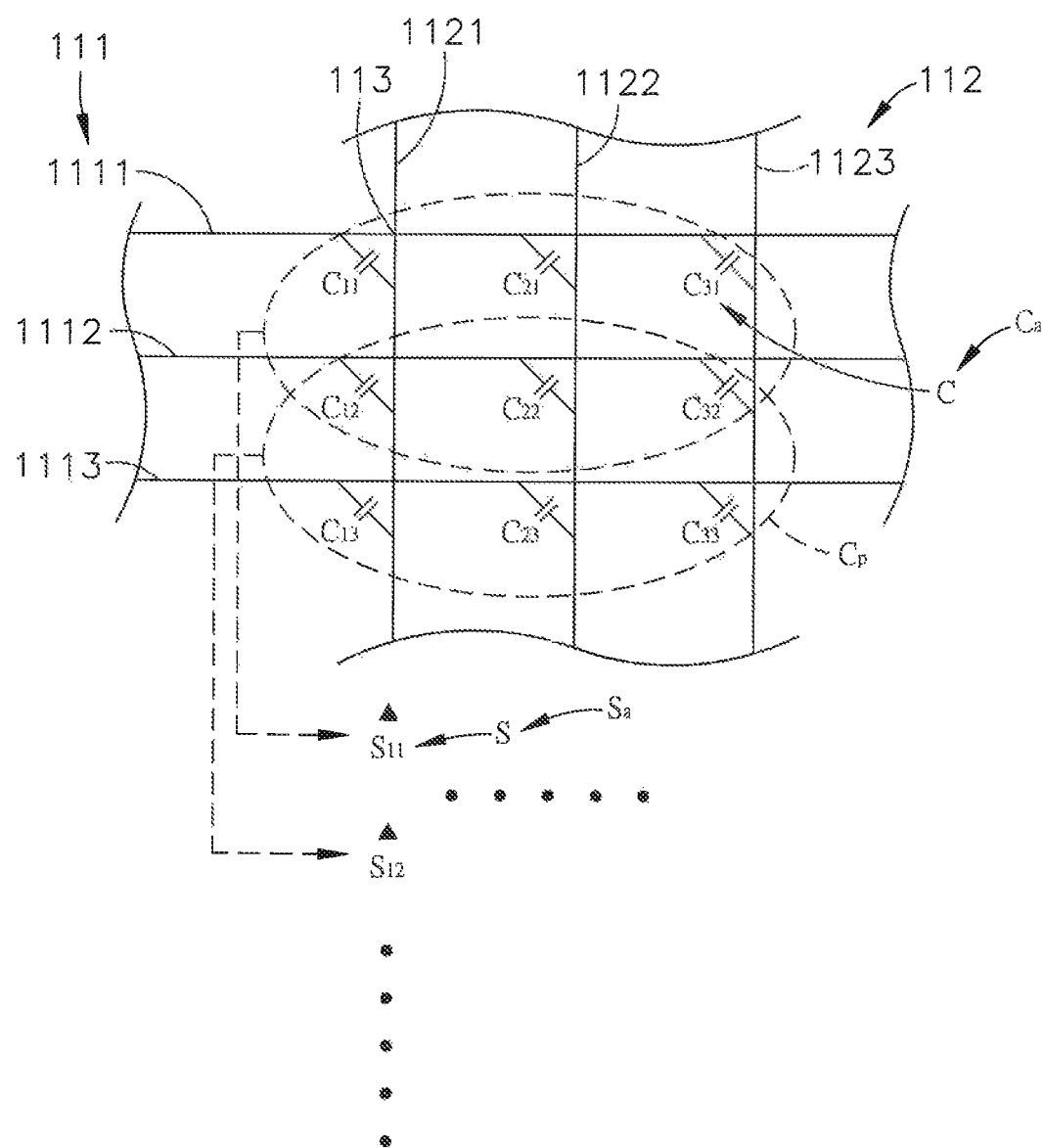
FIG. 8 is a schematic drawing illustrating another example of the creation of the flatness index information in accordance with the present invention.
Figure 9:
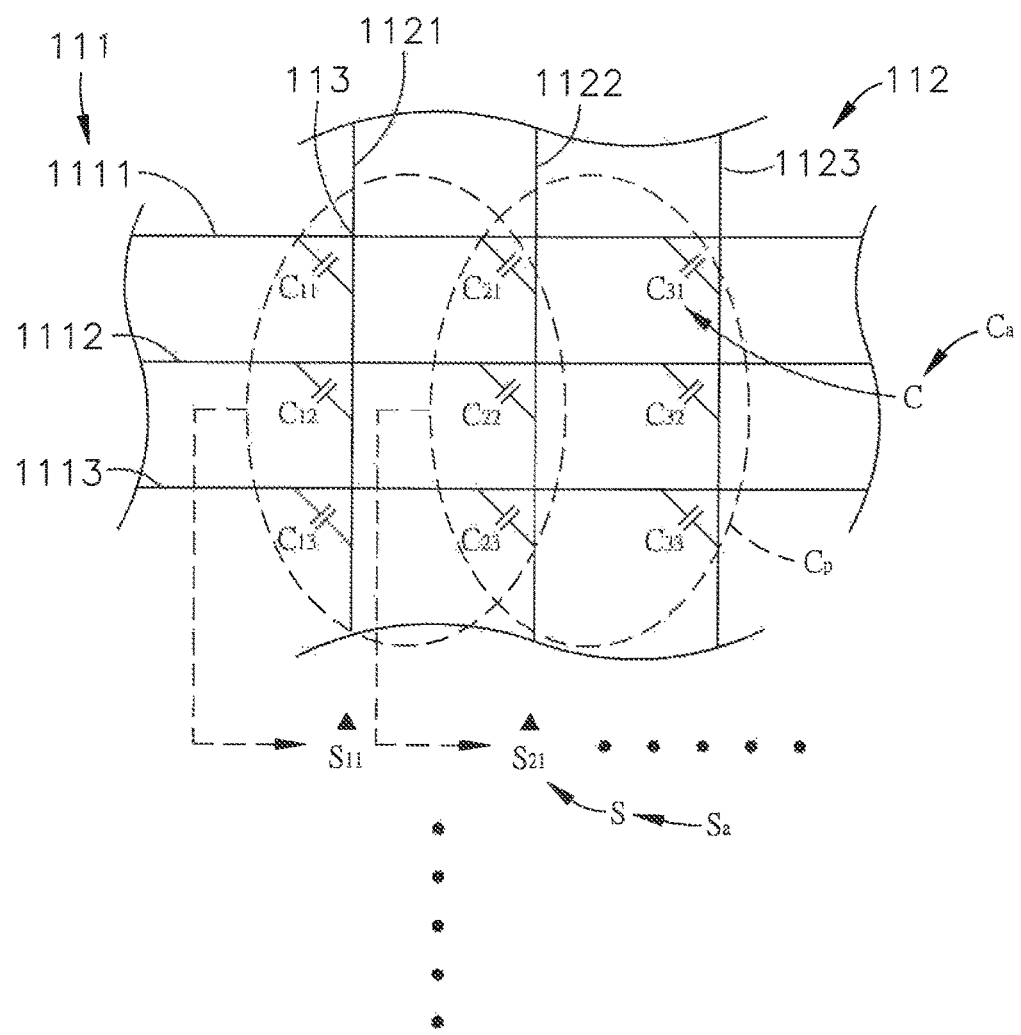
FIG. 9 is a schematic drawing illustrating still another example of the creation of the flatness index information in accordance with the present invention.

Referring to FIGS. 8 and 9 and FIG. 7 again, three alternative methods for the creation of the flatness index information in accordance with the present invention are illustrated. As illustrated, local 2-dimensional sensing information $C_p$ are obtained by integrating each predetermined number of adjacent crossover points 113 of all the crossover points 113 and their respective capacitive coupling amounts C, and all the created local 2-dimensional sensing information $C_p$ are computed to get respective flatness indexes S by subtracting the multiple capacitive coupling amounts C at each driving line 111 from one another in the order along the first axis to get respective remainders, and then subtracting the remainders from one another in the order along the second axis, and the respective flatness indexes S and the respective coordinate data of the local 2-dimensional sensing information $C_p$ are integrated into a flatness index information $S_a$, and then uses this flatness index information $S_a$ for determining the quality of the touch sensing panel 11.

In the first example of the present invention, as shown in FIG. 7, the creation of the local 2-dimensional sensing information $C_p$ are based on the crossover points 113 between the first and second driving lines 1111 and 1112 and the first and second sensing lines 1121 and 1122. According to this example, the first flatness index $S_{11}$ is obtained by: measuring the first capacitive coupling amount $C_{11}$ and second capacitive coupling amount $C_{21}$ at the crossover points 113 at the first place in the first axis direction between the first driving line 1111 and the first sensing line 1121 and second sensing lines 1122 and then performing a differential operation on the first capacitive coupling amount $C_{11}$ and the second capacitive coupling amount $C_{21}$ to get a first difference value, and then measuring the third capacitive coupling amount $C_{12}$ and fourth capacitive coupling amount $C_{22}$ at the crossover points 113 at the second place in the first axis direction between the second driving line 1112 and the first and second sensing lines 1121 and 1122 and then performing a differential operation on the third capacitive coupling amount $C_{12}$ and the fourth capacitive coupling amount $C_{22}$ to get a second difference value, and then performing a differential operation on the first difference value and the second difference value in the order along the second axis to get the first flatness index $S_{11}$.

In this first example, the capacitive coupling amounts C at the four crossover points 113 between each two adjacent driving lines 111 and the respective two adjacent sensing lines 112 are put in the expression: $S_{x,y}=(C_{x,y}-C_{x+1,y})-(C_{x,y+1}-C_{x+1,y+1})$ to obtain all flatness indexes $S_{x,y}$, wherein x: the sequential order of the driving line 111 (for example, the first driving line 1111 or the second driving line 1112, etc.); y: the sequential order of the sensing line 112 (for example, the first sensing line 1121 or the second sensing line 1122, etc.). Thus, the first example can be: $S_{11}=(C_{11}-C_{21})-(C_{12}-C_{22})$.

In the second example of the present invention, as shown in FIG. 8, the creation of the local 2-dimensional sensing information $C_p$ are based on the crossover points 113 between the first and second driving lines 1111 and 1112 and the first, second and third sensing lines 1121, 1122 and 1123. According to this example, the first flatness index $S_{11}$ is obtained by: measuring the first capacitive coupling amount $C_{11}$, second capacitive coupling amount $C_{21}$ and third capacitive coupling amount $C_{31}$ at the crossover points 113 at the first place in the first axis direction between the first driving line 1111 and the first, second and third sensing lines 1121, 1122 and 1123, and the then performing a differential operation on the first capacitive coupling amount $C_{11}$ and the second capacitive coupling amount $C_{21}$ to get a first difference value, and then performing a differential operation on the second capacitive coupling amount $C_{21}$ and the third capacitive coupling amount $C_{31}$ so as to get a second difference value, and then performing a differential operation on the first difference value and the second difference value so as to get a third difference value, and then measuring the fourth capacitive coupling amount $C_{12}$, the fifth capacitive coupling amount $C_{22}$ and the sixth capacitive coupling amount $C_{32}$ at the crossover points 113 at the second place in the first axis direction between the second driving line 1112 and the first, second and third sensing lines 1121, 1122 and 1123 and then performing a differential operation on the fourth capacitive coupling amount $C_{12}$ and the fifth capacitive coupling amount $C_{22}$ to get a fourth difference value, and then performing a differential operation on the fifth capacitive coupling amount $C_{22}$ and the sixth capacitive coupling amount $C_{32}$ to get a fifth difference value, and then performing a differential operation on the fourth difference value and the fifth difference value to get a sixth difference value, and then performing a differential operation on the third difference value and the sixth difference value in the order along the second axis to get the first flatness index $S_{11}$.

In the second example, the capacitive coupling amounts C at the six crossover points 113 between each two adjacent driving lines 111 and the respective three adjacent sensing lines 112 are put in the expression: $S_{x,y} = [(C_{x,y} - C_{x+1,y}) - (C_{x+1,y} - C_{x+2,y})] - [(C_{x,y+1} - C_{x+1,y+1}) - (C_{x+1,y+1} - C_{x+2,y+1})]$ to obtain all flatness indexes $S_{x,y}$, wherein x: the sequential order of the driving line 111; y: the sequential order of the sensing line 112. Thus, this second example can be: $S_{11} = [(C_{11} - C_{21}) - (C_{21} - C_{31})] - [(C_{12} - C_{22}) - (C_{22} - C_{32})]$.

In the third example of the present invention, as shown in FIG. 9, the creation of the local 2-dimensional sensing information $C_p$ are based on the crossover points 113 between the first, second and third driving lines 1111, 1112 and 1113 and the first and second sensing lines 1121 and 1122. According to this third example, the first flatness index $S_{11}$ is obtained by: measuring the first capacitive coupling amount $C_{11}$ and the second capacitive coupling amount $C_{21}$ at the crossover points 113 at the first place in the first axis direction between the first driving line 1111 and the first and second sensing lines 1121 and 1122, and then performing a differential operation on the first capacitive coupling amount $C_{11}$ and the second capacitive coupling amount $C_{21}$ to get a first difference value, and then measuring the third capacitive coupling amount $C_{12}$ and fourth capacitive coupling amount $C_{22}$ at the crossover points 113 at the second place in the first axis direction between the second driving line 1112 and the first and second sensing lines 1121 and 1122, and then performing a differential operation on the third capacitive coupling amount $C_{12}$ and the fourth capacitive coupling amount $C_{22}$ to get a second difference value, and then measuring the fifth capacitive coupling amount $C_{13}$ and sixth capacitive coupling amount $C_{23}$ at the crossover points 113 at the second place in the first axis direction between the third driving line 1113 and the first and second sensing lines 1121 and 1122, and then performing a differential operation on the fifth capacitive coupling amount $C_{13}$ and the sixth capacitive coupling amount $C_{23}$ to get a third difference value, and then performing a differential operation on the first difference value and the second difference value to get a fourth difference value, and then performing a differential operation on the second difference value and the third difference value to get a fifth difference value, and then performing a differential operation on the fourth difference value and the fifth difference value in the order along the second axis to get the first flatness index $S_{11}$.

In the third example, the capacitive coupling amounts C at the six crossover points 113 between each three adjacent driving lines 111 and the respective two adjacent sensing lines 112 are put in the expression: $S_{x,y} = [(C_{x,y} - C_{x+1,y}) - (C_{x,y+1} - C_{x+1,y+1})] - [(C_{x,y+1} - C_{x+1,y+1}) - (C_{x,y+2} - C_{x+1,y+2})]$ to obtain all flatness indexes $S_{x,y}$, wherein x: the sequential order of the driving line 111; y: the sequential order of the sensing line 112. Thus, this third example can be: $S_{11} = [(C_{11} - C_{21}) - (C_{12} - C_{22})] - [(C_{12} - C_{22}) - (C_{13} - C_{23})]$.

In conclusion, the invention provides a mutual capacitance touch sensing device and method for inspecting same. The mutual capacitance touch sensing device inspection method of the present invention is adapted for inspecting the quality of a touch sensing panel 11 of a mutual capacitance touch sensing device 1 by measuring the capacitive coupling amount C of each of all the crossover points 113 between the respective driving lines 111 and the respective sensing lines 112 of the touch sensing panel 11, and then integrating the measured capacitive coupling amounts C at all the crossover points 113 and the respective coordinate data of the all crossover points 113 into respective 2-dimensional sensing information $C_a$, and then enabling a processor 13 of the mutual capacitance touch sensing device 1 to create local 2-dimensional sensing information $C_p$ by integrating each predetermined number of adjacent crossover points 113 of all the crossover points 113 and their respective capacitive coupling amounts C, and then enabling the processor 13 to compute all the created local 2-dimensional sensing information $C_p$ so as to get respective flatness indexes S, and then enabling the processor 13 to integrate the respective flatness indexes S and the respective coordinate data of the local 2-dimensional sensing information $C_p$ into a flatness index information $S_a$, and then enabling the processor 13 to compare each flatness index S of the flatness index information $S_a$ with a predetermined flatness index negative reference value $Z_{min}$, a predetermined flatness index positive reference value $Z_{max}$, a predetermined lower limit value $S_{min}$ and a predetermined upper limit value $S_{max}$ so as to determine the touch sensing panel 11 to be a qualified (up-to-grade) product, a defective-acceptable product or a defective product. Thus, the invention eliminates the problem of unnecessary waste due to continuously processing a defective touch sensing panel through a series of follow-up processing procedures, such as packing, delivery, and etc.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A mutual capacitance touch sensing device inspection method for inspecting the quality of a mutual capacitance touch sensing device comprising a touch sensing panel having arranged therein a plurality of driving lines extending along a first axis in a parallel manner and a plurality of sensing lines extending along a second axis in a parallel manner and crossed over the driving lines to form a plurality of crossover points, a driving and sensing circuit electrically connected with the driving lines and the sensing lines, a processor electrically connected with the driving and sensing circuit, and a memory electrically connected to the processor, the mutual capacitance touch sensing device inspection method comprising the steps of:

(A01) the driving and sensing circuit measuring the capacitive coupling amount of each of all the crossover points, and then integrating the measured capacitive coupling amount of each of all the crossover points and the respective coordinate data of the crossover points into respective 2-dimensional sensing information;

(A02) the processor processing the 2-dimensional sensing information to create local 2-dimensional sensing information by integrating each predetermined number of adjacent the crossover points of all the crossover points and the respective capacitive coupling amounts thereof;

(A03) the processor computing with the created local 2-dimensional sensing information to get respective flatness indexes by: subtracting the multiple capacitive coupling amounts of a plurality of crossover points at each driving line from one another in the order along the first axis to get respective remainders, and then subtracting the remainders from one another in the order along the second axis, and then integrating the respective flatness indexes and the respective coordinate data of the local 2-dimensional sensing information to create a flatness index information;

(A04) the processor comparing each flatness index of the flatness index information with a predetermined flatness index negative reference value, a predetermined flatness index positive reference value, a predetermined lower limit value and a predetermined upper limit value; wherein if every flatness index is in the range between the predetermined flatness index negative reference value and the predetermined flatness index positive reference value, the processor determines that the touch sensing panel is a qualified (up-to-grade) product; wherein if any one flatness index is in the range between the predetermined lower limit value and the predetermined flatness index negative reference value or in the range between the predetermined flatness index positive reference value and the predetermined upper limit value, the processor determines that the touch sensing panel is a defective-acceptable product; and wherein if any one of the flatness indexes is smaller than the predetermined lower limit value or greater than the predetermined upper limit value, the processor determines that the touch sensing panel is a defective product;

(A05) transmitting and storing defective-acceptable flatness indexes in the memory, wherein the defective-acceptable flatness indexes is the flatness index in the range between the predetermined lower limit value and the predetermined flatness index negative reference value or in the range between the predetermined flatness index positive reference value and the predetermined upper limit value; wherein the defective-acceptable flatness indexes are less than all of the flatness indexes; and (A06) reading the defective-acceptable flatness indexes from the memory and computing the flatness indexes other than the defective-acceptable flatness indexes as of zero value to reconstruct the flatness index information.

2. The mutual capacitance touch sensing device inspection method as claimed in claim 1, wherein in step (A03), the processor computing with the created local 2-dimensional sensing information to get each flatness index subject to the following sub-steps:

(a) measuring a first capacitive coupling amount and a second capacitive coupling amount of the crossover points between first and second sensing lines of the plurality of sensing lines and a first driving line of the plurality of driving lines along the first axis;

(b) performing a differential operation on the first capacitive coupling amount and the second capacitive coupling amount to get a first difference value;

(c) measuring a third capacitive coupling amount and a fourth capacitive coupling amount of the crossover points between the first and second sensing lines of the plurality of sensing lines and a second driving line of the plurality of driving lines along the first axis;

(d) performing a differential operation on the third capacitive coupling amount and the fourth capacitive coupling amount to get a second difference value; and (e) performing a differential operation on the first difference value and the second difference value to get the flatness index.

3. The mutual capacitance touch sensing device inspection method as claimed in claim 1, wherein in step (A03), the processor computing with the created local 2-dimensional sensing information to get each flatness index subject to the following sub-steps:

(a) measuring a first capacitive coupling amount, a second capacitive coupling amount and a third capacitive coupling amount of the crossover points between first, second and third sensing lines of the plurality of sensing lines and a first driving line of the plurality of driving lines along the first axis;

(b) performing a differential operation on the first capacitive coupling amount and the second capacitive coupling amount to get a first difference value;

(c) performing a differential operation on the second capacitive coupling amount and the third capacitive coupling amount to get a second difference value;

(d) performing a differential operation on the first difference value and the second difference value to get a third difference value;

(c) measuring a fourth capacitive coupling amount, a fifth capacitive coupling amount and a sixth capacitive coupling amount of the crossover points between the first, second and third sensing lines of the plurality of sensing lines and a second driving line of the plurality of driving lines along the first axis;

(d) performing a differential operation on the fourth capacitive coupling amount and the fifth capacitive coupling amount to get a fourth difference value;

(e) performing a differential operation on the fifth difference value and the sixth difference value to get a fifth difference value;

(f) performing a differential operation on the fourth difference value and the fifth difference value and the fifth different value to get a sixth difference value; and (g) performing a differential operation on the third difference value and the sixth difference value along the second axis to get the flatness index.

4. The mutual capacitance touch sensing device inspection method as claimed in claim 1, wherein in step (A03), the processor computing with the created local 2-dimensional sensing information to get each flatness index subject to the following sub-steps:

(a) measuring a first capacitive coupling amount and a second capacitive coupling amount of the crossover points between first and second sensing lines of the plurality of sensing lines and a first driving line of the plurality of driving lines along the first axis;

(b) performing a differential operation on the first capacitive coupling amount and the second capacitive coupling amount to get a first difference value;

(c) measuring a third capacitive coupling amount and a fourth capacitive coupling amount of the crossover points between first and second sensing lines of the plurality of sensing lines and a second driving line of the plurality of driving lines along the first axis;

(d) performing a differential operation on the third capacitive coupling amount and the fourth capacitive coupling amount to get a second difference value;

(e) measuring a fifth capacitive coupling amount and a sixth capacitive coupling amount of the crossover points between the first and second sensing lines of the plurality of sensing line and a third driving line of the plurality of driving lines along the first axis;

(f) performing a differential operation on the fifth capacitive coupling amount and the sixth capacitive coupling amount to get a third difference value;

(g) performing a differential operation on the first difference value and the second difference value to get a fourth difference value;

(h) performing a differential operation on the second difference value and the third difference value to get a fifth difference value; and (i) performing a differential operation on the fourth difference value and the fifth difference value along the second axis to get the flatness index.

5. A mutual capacitance touch sensing device comprising:
a touch sensing panel comprising a plurality of driving lines extending along a first axis in a parallel manner, and a plurality of sensing lines extending along a second axis in a parallel manner; each driving line crossing over each sensing line in a crossover configuration to form a plurality of crossover points;
a driving and sensing circuit electrically connected with the driving lines and the sensing line and adapted for measuring the capacitive coupling amount of each of all the crossover points and then integrating the measured capacitive coupling amounts of all the crossover points and the respective coordinate data of the crossover points into respective 2-dimensional sensing information;
a processor electrically connected with the driving and sensing circuit processing the 2-dimensional sensing information to create local 2-dimensional sensing information sensing information by integrating each predetermined number of adjacent crossover points of all the crossover points and their respective capacitive coupling amounts and subtract the multiple capacitive coupling amounts of a plurality of crossover points at each driving line from one another in the order along the first axis to get respective remainders, and then subtracting the remainders from one another in the order along the second axis to get respective flatness index, and then integrating respective flatness indexes and the respective coordinate data of the local 2-dimensional sensing information to create a flatness index information; for determining whether or not the local 2-dimensional sensing information of the flatness index in within the predetermined acceptable range to inspect the touch sensing panel to be a qualified product or defective product; and
a memory electrically connected to the processor and adapted for storing defective-acceptable flatness indexes; wherein the defective-acceptable flatness indexes is the flatness index in the range between the predetermined lower limit value and the predetermined flatness index negative reference value or in the range between the predetermined flatness index positive reference value and the predetermined upper limit value;
wherein the defective-acceptable flatness indexes are less than all of the flatness indexes;
wherein the processor reads the defective-acceptable flatness indexes from the memory and computes the flatness indexes other than the defective-acceptable flatness indexes as of zero value to reconstruct the flatness index information.

6. The mutual capacitance touch sensing device as claimed in claim 5, wherein the touch sensing panel is selectively made in a single layer design where the driving lines and the sensing lines are arranged in one same sensing layer, or a multi-layer design where the driving lines and the sensing lines are arranged in different sensing layers.

7. The mutual capacitance touch sensing device as claimed in claim 5, wherein the driving lines extend along the first axis in a parallel manner; the sensing lines extend along the second axis in a parallel manner and crossed over the driving lines in an orthogonal crossover configuration or non-orthogonal crossover configuration to form the crossover points.

8. The mutual capacitance touch sensing device as claimed in claim 5, wherein the driving and sensing circuit is selectively made in the form of a combination circuit consisting of a driver chip and a sensor chip where the driver chip is electrically coupled with the driving lines and the sensor chip is electrically coupled with the sensing lines, or a monolithic integrated circuit having a driving circuit and a sensing circuit integrated therein.

9. A mutual capacitance touch sensing device comprising:
a touch sensing panel comprising a plurality of driving lines extending along a first axis in a parallel manner, and a plurality of sensing lines extending along a second axis in a parallel manner and crossed over the driving lines to form a plurality of crossover points;
a driving and sensing circuit electrically connected with the driving lines and the sensing line and adapted for measuring a first capacitive coupling amount and a second capacitive coupling amount of the crossover points between first and second sensing lines of the plurality of sensing lines and a first driving line of the plurality of driving lines along the first axis and also a third capacitive coupling amount and a fourth capacitive coupling amount of the crossover points between the first and second sensing lines of the plurality of sensing lines and a second driving line of the plurality of driving lines along the first axis, and then integrating the measured capacitive coupling amounts of all the crossover points and the respective coordinate data of the crossover points into respective 2-dimensional sensing information;
a processor electrically connected with the driving and sensing circuit for computing the 2-dimensional sensing information to get a flatness index information by: performing a differential operation on the first capacitive coupling amount and the second capacitive coupling amount to get a first difference value, and then performing a differential operation on the third capacitive coupling amount and the fourth capacitive coupling amount to get a second difference value, and then performing a differential operation along a second axis on the first difference value and the second difference value to get the flatness index, and then determining whether the flatness index information to be within a predetermined acceptable range to determine the touch sensing panel to be a qualified product or a defective product; and a memory electrically connected to the processor and adapted for storing the flatness indexes; wherein the memory stores defective-acceptable flatness indexes in the memory, wherein the defective-acceptable flatness indexes is the flatness index in the range between the predetermined lower limit value and the predetermined flatness index negative reference value or in the range between the predetermined flatness index positive reference value and the predetermined upper limit value; wherein the defective-acceptable flatness indexes are less than all of the flatness indexes;

wherein the processor reads the defective-acceptable flatness indexes from the memory and computes the flatness indexes other than the defective-acceptable flatness indexes as of zero value to reconstruct the flatness index information.

10. A mutual capacitance touch sensing device comprising:

a touch sensing panel comprising a plurality of driving lines extending along a first axis in a parallel manner, and a plurality of sensing lines extending along a second axis in a parallel manner and crossed over the driving lines to form a plurality of crossover points;

a driving and sensing circuit electrically connected with the driving lines and the sensing line and adapted for measuring a first capacitive coupling amount, a second capacitive coupling amount and a third capacitive coupling amount of the crossover points between first, second and third sensing lines of the plurality of sensing lines and a first driving line of the plurality of driving lines along the first axis and measuring a fourth capacitive coupling amount, a fifth capacitive coupling amount and a sixth capacitive coupling amount of the crossover points between the first, second and third sensing lines of the plurality of sensing lines and a second driving line of the plurality of driving lines along the first axis, and then integrating the measured capacitive coupling amounts of all the crossover points and the respective coordinate data of the crossover points into respective 2-dimensional sensing information;

a processor electrically connected with the driving and sensing circuit for computing the 2-dimensional sensing information to get a flatness index information by: performing a differential operation on the first capacitive coupling amount and the second capacitive coupling amount to get a first difference value, and then performing a differential operation on the second capacitive coupling amount and the third capacitive coupling amount to get a second difference value, and then performing a differential operation on the first difference value and the second difference value to get a third difference value, and then performing a differential operation on the fourth capacitive coupling amount and the fifth capacitive coupling amount to get a fourth difference value, and then performing a differential operation on the fifth difference value and the sixth difference value to get a fifth difference value, and then performing a differential operation on the fourth difference value and the fifth difference value and the fifth different value to get a sixth difference value, and then performing a differential operation on the third difference value and the sixth difference value along the second axis to get the flatness index, and then determining whether the flatness index information to be within a predetermined acceptable range to inspect to be a qualified product or a defective product; and a memory electrically connected to the processor and adapted for storing defective-acceptable flatness indexes; wherein the defective-acceptable flatness indexes is the flatness index in the range between the predetermined lower limit value and the predetermined flatness index negative reference value or in the range between the predetermined flatness index positive reference value and the predetermined upper limit value; wherein the defective-acceptable flatness indexes are less than all of the flatness indexes;

wherein the processor reads the defective-acceptable flatness indexes from the memory and computes the flatness indexes other than the defective-acceptable flatness indexes as of zero value to reconstruct the flatness index information.

11. A mutual capacitance touch sensing device comprising:

a touch sensing panel comprising a plurality of driving lines extending along a first axis in a parallel manner, and a plurality of sensing lines extending along a second axis in a parallel manner and crossed over the driving lines to form a plurality of crossover points;

a driving and sensing circuit electrically connected with the driving lines and the sensing line and adapted for measuring a first capacitive coupling amount and a second capacitive coupling amount of the crossover points between first and second sensing lines of the plurality of sensing lines and a first driving line of the plurality of driving lines along the first axis, and measuring a third capacitive coupling amount and a fourth capacitive coupling amount of the crossover points between the first and second sensing lines of the plurality of sensing lines and a second driving line of the plurality of driving lines along the first axis, and measuring a fifth capacitive coupling amount and a sixth capacitive coupling amount of the crossover points between the first and second sensing lines of the plurality of sensing lines and a third driving line of the plurality of driving lines along the first axis, and then integrating the measured capacitive coupling amounts of all the crossover points and the respective coordinate data of the crossover points into respective 2-dimensional sensing information;

a processor electrically connected with the driving and sensing circuit for computing the 2-dimensional sensing information to get a flatness index information by: performing a differential operation on the first capacitive coupling amount and the second capacitive coupling amount to get a first difference value, and then performing a differential operation on the third capacitive coupling amount and the fourth capacitive coupling amount to get a second difference value, and then performing a differential operation on the fifth capacitive coupling amount and the sixth capacitive coupling amount to get a third difference value, and then performing a differential operation on the first difference value and the second difference value to get a fourth difference value, and then performing a differential operation on the second difference value and the third difference value to get a fifth difference value, and then performing a differential operation on the fourth difference value and the fifth difference value along the second axis to get the flatness index; and a memory electrically connected to the processor and adapted for storing defective-acceptable flatness indexes; wherein the defective-acceptable flatness indexes is the flatness index in the range between the predetermined lower limit value and the predetermined flatness index negative reference value or in the range between the predetermined flatness index positive reference value and the predetermined upper limit value; wherein the defective-acceptable flatness indexes are less than all of the flatness indexes;

wherein the processor reads the defective-acceptable flatness indexes from the memory and computes the flatness indexes other than the defective-acceptable flatness indexes as of zero value to reconstruct the flatness index information.

\* \* \* \* \*